United States Patent [19]

Kanter

[11] 3,883,370

[45] *May 13, 1975

[54] ELECTRICAL BARRIER LAYER COATING AND METHOD FOR MAKING SAME

[76] Inventor: Jerome J. Kanter, 12300 Hobart Ave., Palos Park, Ill. 60464

[ * ] Notice: The portion of the term of this patent subsequent to Oct. 24, 1989, has been disclaimed.

[22] Filed: Aug. 11, 1972

[21] Appl. No.: 279,940

Related U.S. Application Data

[63] Continuation-in-part of Ser. No. 105,650, Jan. 11, 1971, Pat. No. 3,700,505, which is a continuation-in-part of Ser. No. 828,707, May 28, 1969, abandoned.

[52] U.S. Cl. ............... 148/6.35; 117/215; 117/230; 117/234; 148/6.3
[51] Int. Cl. ............................................. B44d 1/18
[58] Field of Search .......... 117/234, 230, 215, 217, 117/111 C, 118, DIG. 1; 148/6.35, 6.3, 6, 6.15 R, 110, 113

[56] References Cited

UNITED STATES PATENTS

| | | | |
|---|---|---|---|
| 2,465,284 | 3/1949 | Schmidt et al. | 117/234 |
| 3,152,930 | 10/1964 | Foster | 148/113 |
| 3,562,011 | 2/1971 | Hirst et al. | 148/113 |
| 3,594,240 | 7/1971 | Foster et al. | 148/113 |
| 3,700,505 | 10/1972 | Kanter | 117/230 |

*Primary Examiner*—Cameron K. Weiffenbach

[57] ABSTRACT

Magnetic metal inductors are provided with electrical barrier layers made by forming an adherent oxide layer on the surface of the inductor, treating the oxide layer with at least one Group III metal, and then oxidizing the Group III metal. The electrical barrier layers are electrically insulative or dielectric. The layers can withstand high temperatures without deterioration and are corrosion resistant.

18 Claims, No Drawings

ELECTRICAL BARRIER LAYER COATING AND METHOD FOR MAKING SAME

This application is a continuation-in-part of application Ser. No. 105,650, filed Jan. 11, 1971, now U.S. Pat. No. 3,700,505 which in turn is a continuation-in-part of application Ser. No. 828,707, filed May 28, 1969 which was forfeited.

FIELD OF THE INVENTION

The present invention relates to electrical barrier layer coatings for magnetic inductors, for example, to such coatings containing inorganic materials, and to processes for preparing such coatings.

BACKGROUND OF THE INVENTION

Many different types of electrical barriers have been proposed and used. Plastics, rubber compounds, and enamels of various types have been used.

Each known barrier coating has characteristic advantages and disadvantages, as well as a limited range of physical, chemical, and electrical properties. For example, some coatings are destroyed by heating to elevated temperatures. Others are water soluble and cannot stand the ravages of the environment to which they are subjected. Many do not have the combination of physical, chemical, and/or electrical properties desired.

SUMMARY OF THE INVENTION

It is accordingly an object of the present invention to provide unique dielectric or insulative coatings for magnetic inductors. It is a further object of the present invention to provide adherent dielectric coatings for conductors which form an intact, novel electrically insulated layer thereon. It is another object of the invention to provide coatings for ferrous base metal articles that also form a protective barrier on the surface thereof, as for instance, against corrosion and oxidation. It is still another object of the invention to provide a coating for ferrous base metal articles that is corrosion resistant, and particularly to a dielectric coating that effectively provides corrosion resistance as well as being electrically insulative. It is yet another object of the invention to provide a dielectric coating that is water insoluble. It is still another object of the invention to provide a coating that can withstand elevated temperatures without deterioration. It is yet another object of the invention to provide novel coatings having a unique combination of physical, chemical, and electrical properties. Other and further objects of the invention will be apparent from the following specification and appended claims.

DESCRIPTION OF THE PREFERRED EMBODIMENT

The conductors upon which the dielectric coating is applied may be any magnetically inductive metal which is a member of the spinel mineral group: manganese, chromium, iron, and alloys of the foregoing, for example, the ferrous base metal alloys, such as the carbon steels and the silicon steels of the type used for magnetic induction. Special preference is given to the weldable carbon steels and silicon steels because of their ready availability, their comparatively advantageous economic position, and their otherwise convenient fabrication and maintainability.

The surface of the magnetic metal inductor to be protected is formed with a tightly adherent oxide layer. The oxide layer is formed by heating the article in air to temperatures in the range below the point at which the oxide layer spalls off. This is accomplished, for example, by heating the ferrous base articles in atmospheric oxygen to temperatures in the range from about 300°F. to about 800°F. As an alternative, the oxide layer may be formed in controlled oxidizing atmospheres. If special oxidizing atmospheres are employed, the required temperatures, of course, may be changed. As another alternative the oxide layer may be formed by exposure to the atmosphere at ambient temperatures for sufficient time to form the oxide film. In any case, temperatures and the time of oxidation are maintained at conditions sufficient to form an adherent oxide film on the metal conductor and oxidation is discontinued prior to the formation of a loose, flaky, nonadherent film.

After the formation of the tightly adherent oxide layer on the magnetic inductor, said oxide layer is treated with at least one metal in Group III of the periodic table. The Group III metal may be, for example, aluminum, scandium, yttrium, or the rare earth metals. The Group III metal is reacted in solid phase with the oxide layer. One procedure for the solid phase reaction is to frictionally contact the surface of the oxide layer with a solid form of Group III metal, as by rubbing, brushing, buffing, and the like. This may be performed, for example, by frictionally rubbing a foil of the Group III metal against the oxide layer, or by applying a powder onto the oxide layer and buffing thereagainst, or by shot peening the Group III metal against the oxide layer. Another procedure is to disperse communited Group III metal particles in a hydrocarbon and to apply the dispersion to the oxide layer, after which the hydrocarbon is evaporated, and the metal buffed against the oxide layer.

In applying aluminum to the oxide layer, for example, aluminum foil may be rubbed frictionally against the oxide layer at ambient temperatures. Sufficient energy is applied in the frictional contacts during rubbing to cause a reaction between the oxide layer and the aluminum.

The Group III metal is applied in solid form to the oxide layer. Usually ambient temperatures are adequate for reaction of Group III metal in solid phase with the oxide layer, but in certain instances elevated temperatures may be desirable, and, in any event, the temperatures must be maintained in a range in which the oxide layer will not spall off by the heating. If the oxide layer is formed on the ferrous base metal by heating, it may be advantageous to apply the Group III metal prior to complete cooling of the article.

The Group III metal will be applied in solid form with the oxide layer in temperatures ranging from ambient to the point at which the oxide layer spalls off; in case of ferrous base metal articles temperatures at which critical transformation occur tend to cause the oxide layer to spall off.

Yttrium and rare earth metals desirably are reacted with the oxide layer as powders. Because the powdered forms of the yttrium and rare earth metals are pyrophoric, they are handled preferably under protective materials, for example, inert hydrocarbons. The inert hydrocarbons are volatilized from the surface after the application. By way of example, after aluminum has been frictionally contacted with an oxide layer, yttrium may be applied to the aluminum treated layer under the protection of a hydrocarbon, then the hydrocarbon is evaporated, and the yttrium mechanically worked against the layer.

The rare earth metals usually occur in mixtures, such as misch metal. They are conveniently applied, therefore, as mixtures.

Various combinations of Group III metals may be advantageous for some uses. A series of Group III metals may be reacted with the oxide layer. For example, it may be desirable first to apply aluminum, and next to apply yttrium, or misch metal, to the oxide layer.

In some instances, it may be desirable to provide an additional complexing step with a chromium containing material, such as the metal, after reacting the oxide layer with the Group III metal. Chromium metal may be applied to the oxide layer in finely divided form, for example, as a comminuted powder under the protection of a hydrocarbon, and after such treatment the hydrocarbon is evaporated.

In some instances it may be desirable to provide an additional complexing step with the oxide layer by a Group V metal. Thus, after reacting the oxide layer with the Group III metal, the oxide layer may be further complexed with a metal from Group V of the periodic table. This may be with or without the additional step of complexing with chromium. Exemplary Group V metals are: vanadium, columbium, and tantalaum. These metals may be complexed in solid form with the oxide layer by using the procedures described above in connection with the Group III metals.

The application of the Group III metal as disclosed above results in some sort of reaction with the oxide layer not fully understood, but it is believed, for example, that aluminum forms a complex compound with the iron oxide layer. In any case, a tough adherent coating is formed. An excess of Group III metal for reaction with the oxide layer is applied.

Subsequent to the application of the Group III metal to the oxide layer, the Group III in the coating is oxidized. This may be performed by treating with a phosphorus containing acidic compound. The phosphorus containing acid compounds include the phosphoric acids, such as ortho-phosphoric acid, thio-phosphoric acids, and the acid salts and/or acid esters of the foregoing. The esters may include the mono-alkyl acid phosphates, dialkyl acid phosphates, and dialkyl acid pyrophosphates. For many purposes, some of the phosphorus containing acidic compounds may be preferred to the others, and not all of the foregoing may be suitable or equally desirable for all purposes. By reason of its cost and availability, ortho-phosphoric acid is preferred for many purposes.

The phosphorus containing acidic compounds are conveniently applied by spraying on the article, or by dipping the article in a bath containing the phosphorus compound. The phosphorus containing acid compounds are believed to react with the Group III metal that has been complexed on the oxide layer to form a water-insoluble salt.

After the treatment with phosphorus containing acid compounds, the article may be washed with water and dried.

Other oxidizing operations are contemplated, for example, treating with nitric acid, chromic acid, sodium chromate, as well as other known oxidizing techniques.

The oxidation of the Group III metal improves the coating in many important physical characteristics. The coating is made electrically insulative, which has many useful applications. The coating is also made more corrosive resistant. The coating after the Group III metal has been oxidized is subject to further treatment with other metals, for example, the Group V metals, as by the techniques set forth above.

The oxidation of the Group III metal may be performed in a configuration that will provide selected electrical characteristics. For instance, a ribbon of Group III metal may be un-oxidized, while the remainder is oxidized to provide electrically conducting and non-conducting areas on the surface of the coating. At least a portion of the Group III metal is oxidized, however, to provide benefits to the coating.

The following examples set forth preferred methods of carrying out the invention. They are furnished by way of illustrations, and not as limitations to the invention.

EXAMPLE 1

The surface of a piece of carbon steel plate was oxidized by heating in air to ranges from 500°F. to 700°F., to form an adherent oxide film thereon. The oxide film was rubbed with aluminum foil until an excess of aluminum was noted on the surface. The article then was dipped in a bath of technical grade concentrated phosphoric acid. The article was maintained in the phosphoric acid bath during the reaction evidenced by the formation of hydrogen gas. After the evolution of hydrogen gas had discontinued, the article was lifted from the bath, the excess phosphoric acid removed, and the article cleaned by washing with tap water, and allowed to dry.

The article so treated was tested for its electrical conductivity and the oxide treated layer was found to be electrically insulative. The article was also tested for its resistance to corrosion by hot water in a humidity bath over a 48 hour period. No visible corrosion was apparent.

EXAMPLE 2

The same procedure is followed as set forth in Example 1, except that after the frictional application of aluminum foil, comminuted yttrium powder dispersed in propane is sprayed on the oxide layer. The propane is volatilized and the article immediately dipped in the phosphoric acid bath.

EXAMPLE 3

The same procedure is employed as set forth in Example 1, except that after the frictional application of aluminum foil, misch metal dispersed in propane is sprayed on the oxide layer. The article thereafter is dipped in the phosphoric acid bath.

EXAMPLE 4

The same procedure is followed as set forth in Example 1, except that after the frictional application of aluminum foil, the oxide layer is further treated with communited columbium metal particles. The article thereafter was dipped in the phosphoric acid bath.

EXAMPLE 5

A stainless steel 18-8 plate was heated to about 1300°F. for 1 hour to form an oxide film on the surface. The oxide film was rubbed with aluminum foil until excess aluminum was apparent on the surface. The aluminum is then oxidized by dipping in nitric acid.

The invention lends itself to many applications. The conductor may be first fabricated to the desired shape, and then subjected to the electrical barrier coating process described hereinabove.

There are many unusual advantages resulting from the electrical barrier coating of the foregoing described invention. The coating in addition to being electrically insulative forms a water insoluble layer that resists corrosion by water and steam. In electrical power plants the water systems are maintained at an alkaline pH. The coating described herein may be used for electrical barriers and also to provide corrosion resistance of parts used in such systems to water and steam corrosion.

Moreover, the coatings can withstand high temperatures without deterioration. For example, carbon steel conductors with the electrical barrier coating of the invention can withstand temperatures as high as 1000°F. without deterioration.

The invention contemplates forming the electrical barrier on a wide variety of conductors. For example, the electrical barrier layer of the invention may be formed on the armatures of transformer, on the armatures of electromagnets, on the armatures of solenoids, as well as on wire conductors. Moreover, many solid state devices, such as, rectifiers, transistors, diodes, and the like, contain metal components on which the electrical barrier described hereinabove with its combination of chemical, physical, and/or electrical properties is usefully employed.

The exact nature of the coating is not known. It is believed, however, that a succession of complexes are formed between the oxide layer, the Group III metal, and the oxidizing operation to produce a barrier having the novel physical, chemical and/or electrical properties.

Other modes of applying the principles of the invention may be employed, change being made as regards the details described, provided the features stated in any of the following claims, or the equivalent of such, be employed.

I claim:

1. In a process for providing an electrical barrier layer on magnetic inductors having an adherent oxide layer formed on a surface thereof, the steps comprising:
   complexing said oxide layer of the magnetic inductor with at least one metal in solid phase from Group III of the Periodic Table by mechanical frictional contact therebetween in order to complex said Group III metal with said oxide layer;
   said Group III metal selected from the group consisting of aluminum, scandium, yttrium, and the rare earth metals;
   said oxide layer formed by oxidation of said magnetic inductor metal;
   said magnetic inductor comprising at least one metal from the spinel mineral group selected from the class consisting of iron, chromium, manganese, and the alloys thereof; and
   oxidizing at least a portion of said Group III metal contained in said layer.

2. A process according to claim 1 in which said magnetic inductor comprises a ferrous base metal.

3. A process according to claim 1 in which said magnetic inductor comprises carbon steel.

4. A process according to claim 1 in which said Group III metal comprises aluminum.

5. A magnetic inductor metal provided with the electrical barrier layer produced in accordance with the process of claim 4.

6. A process according to claim 1 in which said Group III metal comprises at least one rare earth metal.

7. A magnetic inductor metal provided with the electrical barrier layer produced in accordance with the process of claim 6.

8. A process according to claim 1 in which said Group III metal comprises yttrium.

9. A magnetic inductor metal provided with the electrical barrier layer produced in accordance with the process of claim 8.

10. A process according to claim 1 in which said magnetic inductor comprises silicon steel.

11. A magnetic inductor metal provided with the electrical barrier layer produced in accordance with the process of claim 10.

12. In a process for providing an electrical barrier layer on magnetic inductor, the steps comprising:
    forming tightly adherent oxide layer on a surface of a magnetic inductor by oxidation of the magnetic inductor metal;
    said magnetic inductor comprising at least one metal from the metals in the spinel mineral group selected from the class consisting of iron, chromium, manganese, and the alloys thereof;
    complexing said oxide layer with at least one metal in solid form from Group III of the Periodic Table in sufficient amounts of mechanical frictional contact in order to form an electrical barrier layer thereon, and
    said Group III metal selected from the class consisting of aluminum, scandium, yttrium, and the rare earth metals, and
    oxidizing at least a portion of the Group III metal contained in said layer.

13. A process according to claim 12 in which said Group III metal comprises aluminum.

14. A process according to claim 12 in which said Group III metal comprises yttrium.

15. A process according to claim 12 in which said Group III metal comprises at least one rare earth metal.

16. The process according to claim 12 in which said magnetic inductor comprises a ferrous base metal alloy.

17. The process according to claim 12 in which said magnetic inductor comprises carbon steel.

18. The process according to claim 12 in which said magnetic inductor comprises silicon steel.

* * * * *